US007758008B2

(12) United States Patent
Kojima et al.

(10) Patent No.: US 7,758,008 B2
(45) Date of Patent: Jul. 20, 2010

(54) SEAT SLIDING APPARATUS FOR VEHICLE

(75) Inventors: Yasuhiro Kojima, Kariya (JP); Hideo Nihonmatsu, Anjo (JP); Mikihito Nagura, Okazaki (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 259 days.

(21) Appl. No.: 11/837,784

(22) Filed: Aug. 13, 2007

(65) Prior Publication Data

US 2008/0048087 A1 Feb. 28, 2008

(30) Foreign Application Priority Data

Aug. 25, 2006 (JP) .............................. 2006-229198

(51) Int. Cl.
*F16M 13/00* (2006.01)
(52) U.S. Cl. ..................... 248/430; 248/429; 297/344.1
(58) Field of Classification Search ................. 248/424, 248/429, 430, 419, 420, 297.1; 297/344.1, 297/344.11
See application file for complete search history.

(56) References Cited

U.S. PATENT DOCUMENTS

| 2,827,106 | A | * | 3/1958 | Cramer et al. | ............... 248/430 |
| 3,394,912 | A | * | 7/1968 | Bullen | ......................... 248/430 |
| 3,491,979 | A | * | 1/1970 | Wonell | ........................ 248/430 |
| 4,168,051 | A | * | 9/1979 | Terada | ......................... 248/429 |
| 4,238,099 | A | * | 12/1980 | Hunwicks | ................... 248/430 |
| 4,572,469 | A | * | 2/1986 | Rees | ............................ 248/430 |
| 4,580,755 | A | * | 4/1986 | Rees | ............................ 248/430 |
| 4,629,254 | A | * | 12/1986 | Stolper et al. | ............... 297/473 |
| 4,726,617 | A | * | 2/1988 | Nishimura | ............... 296/65.13 |
| 4,730,804 | A | * | 3/1988 | Higuchi et al. | .............. 248/429 |
| 4,804,229 | A | * | 2/1989 | Nishino | ....................... 297/471 |

(Continued)

FOREIGN PATENT DOCUMENTS

EP 1 384 618 A1 1/2004

(Continued)

OTHER PUBLICATIONS

U.S. Appl. No. 11/837,913, filed Aug. 13, 2007, Kojima, et al.

(Continued)

*Primary Examiner*—Kimberly T Wood
(74) *Attorney, Agent, or Firm*—Oblon, Spivak, McClelland, Maier & Neustadt, L.L.P.

(57) ABSTRACT

A seat sliding apparatus for a vehicle includes a lower rail including a base bottom portion, first inner and outer side portions, upper portions, and second inner and outer side portions, an upper rail movably supported relative to the lower rail and including a base top portion, first inner and outer extending portions, connecting portions, and second inner and outer extending portions, a lock mechanism including a lock portion provided at the first inner side portion, a bracket, and a lock member engageable with and disengageable from the lock portion, a cutout portion formed across the base top portion and the first inner extending portion and into which the lock member is inserted, and through-holes provided at the second inner extending portion and the bracket, respectively, the through-holes into which the lock member is inserted while the lock member is engaging with the lock portion.

6 Claims, 9 Drawing Sheets

U.S. PATENT DOCUMENTS

| | | | | |
|---|---|---|---|---|
| 4,821,991 A * | 4/1989 | Aihara et al. | | 248/430 |
| 5,028,028 A * | 7/1991 | Yamada et al. | | 248/430 |
| 5,076,529 A * | 12/1991 | Dove et al. | | 248/429 |
| 5,192,045 A * | 3/1993 | Yamada et al. | | 248/430 |
| 5,918,846 A * | 7/1999 | Garrido | | 248/429 |
| 6,170,790 B1 * | 1/2001 | Schuler et al. | | 248/430 |
| 6,328,272 B1 * | 12/2001 | Hayakawa et al. | | 248/429 |
| 6,354,553 B1 * | 3/2002 | Lagerweij et al. | | 248/430 |
| 6,416,130 B2 * | 7/2002 | Yamada et al. | | 297/344.11 |
| 6,435,465 B1 * | 8/2002 | Yamada et al. | | 248/429 |
| RE37,990 E * | 2/2003 | Yamada et al. | | 248/430 |
| 6,688,574 B2 | 2/2004 | Okazaki et al. | | |
| 6,773,068 B2 * | 8/2004 | Shinozaki | | 297/344.1 |
| 6,869,057 B2 * | 3/2005 | Matsumoto et al. | | 248/430 |
| 6,874,747 B2 * | 4/2005 | Oh | | 248/430 |
| 6,926,443 B2 * | 8/2005 | Niimi et al. | | 384/34 |
| 6,953,178 B2 * | 10/2005 | Yamada et al. | | 248/429 |
| 7,147,195 B2 * | 12/2006 | Danjo et al. | | 248/430 |
| 7,191,995 B2 * | 3/2007 | Kim | | 248/429 |
| 7,328,877 B2 * | 2/2008 | Yamada et al. | | 248/430 |
| 7,431,256 B2 * | 10/2008 | Yamada et al. | | 248/429 |
| 2002/0060281 A1 * | 5/2002 | Okazaki et al. | | 248/424 |
| 2004/0011940 A1 * | 1/2004 | Matsumoto | | 248/424 |
| 2004/0124683 A1 * | 7/2004 | Matsumoto et al. | | 297/344.1 |
| 2004/0222347 A1 | 11/2004 | Oh | | |
| 2006/0022109 A1 * | 2/2006 | Yamada et al. | | 248/429 |
| 2006/0131470 A1 | 6/2006 | Yamada et al. | | |
| 2007/0090260 A1 * | 4/2007 | Kojima | | 248/424 |

FOREIGN PATENT DOCUMENTS

| | | | |
|---|---|---|---|
| GB | 942976 | | 11/1963 |
| JP | 53121325 A | * | 10/1978 |
| JP | 58016928 A | * | 1/1983 |
| JP | 2002160554 A | * | 6/2002 |
| JP | 2004-231106 | | 8/2004 |
| JP | 2004-314956 | | 11/2004 |
| JP | 2005-82059 | | 3/2005 |
| JP | 2005-263049 | | 9/2005 |
| WO | WO 2007/129435 A1 | | 11/2007 |

OTHER PUBLICATIONS

U.S. Appl. No. 11/841,263, filed Aug. 20, 2007, Kojima, et al.

* cited by examiner

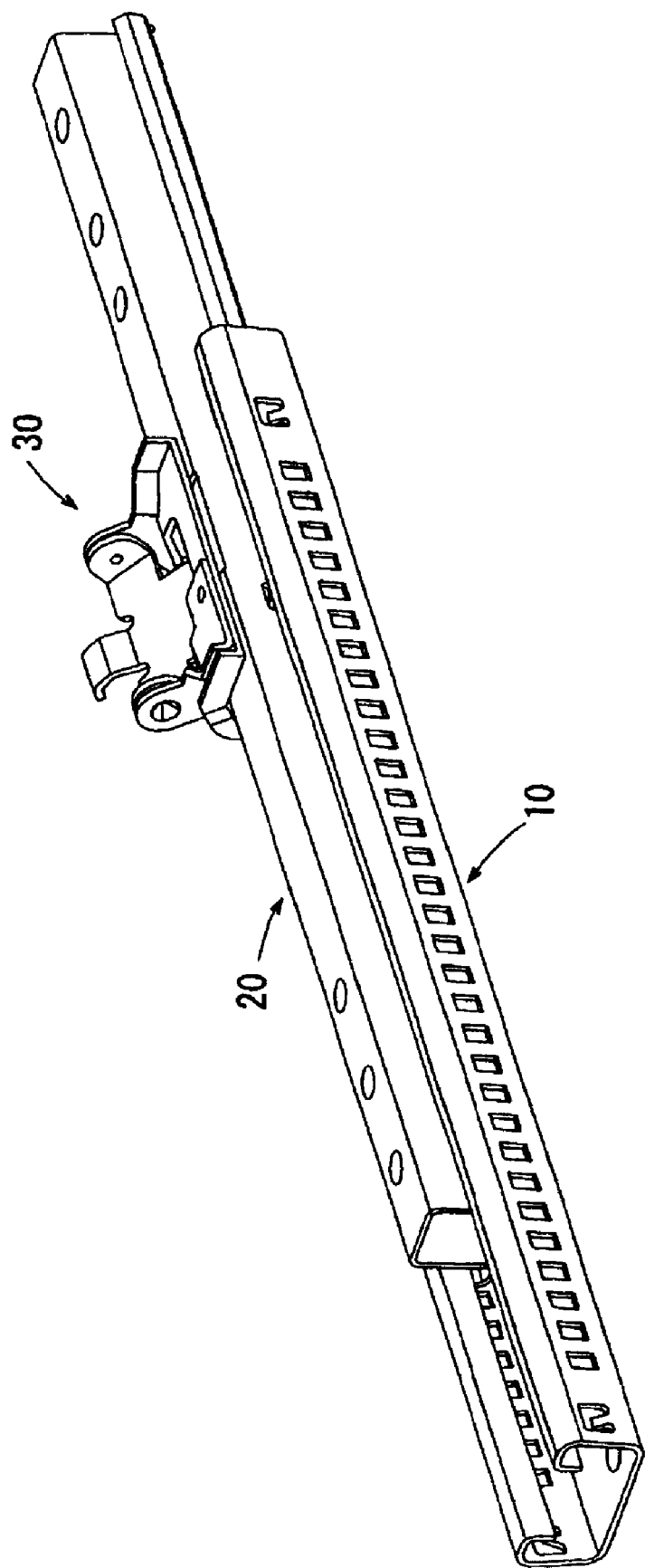
F I G. 2

US 7,758,008 B2

SEAT SLIDING APPARATUS FOR VEHICLE

CROSS REFERENCE TO RELATED APPLICATIONS

This application is based on and claims priority under 35 U.S.C. §119 to Japanese Patent Application No. 2006-229198, filed on Aug. 25, 2006, the entire content of which is incorporated herein by reference.

FIELD OF TEE INVENTION

This invention generally relates to a seat sliding apparatus for a vehicle.

BACKGROUND

A known seat sliding apparatus for a vehicle is disclosed in JP2005-82059A. As illustrated in FIG. 10, the seat sliding apparatus disclosed includes a lower rail 100, an upper rail 110, a lock mechanism 120, and a release lever 125. The lower rail 100 is fixed to a vehicle floor. The upper rail 110 is fixed to a vehicle seat and movably supported relative to the lower rail 100. The lock mechanism 120 includes multiple lock bores 104a (lock portion) and a lock member 123. The lock bores 104a are provided at the lower rail 100 in a longitudinal direction thereof. The lock member 123 is provided at the upper rail 110 so as to be rotatable on a rotational axis extending in a longitudinal direction of the upper rail 110, and is engageable with and disengageable from the lock bores 104a.

More specifically, the lower rail 100 includes a base bottom portion 101 arranged substantially in parallel with the vehicle floor, a first side portion 102 upwardly extending from one end of the base bottom portion 101, an upper portion 103 inwardly extending from an upper end of the first side portion 102, and a second side portion 104 downwardly extending from an inner one end of the upper portion 103. The lock bores 104a are provided at the second side portion 104. In addition, the upper rail 110 includes a base top portion 111 arranged substantially in parallel with the base bottom portion 101 of the lower rail 100, a first extending portion 112 downwardly extending from one end of the base top portion 111, a connecting portion 113 outwardly extending from a lower end of the first extending portion 112, and a second extending portion 114 upwardly extending from an outer one end of the connecting portion 113. Further, through-holes 112a and 114a are provided at the first extending portion 112 and the second extending portion 114 of the upper rail 110, respectively, so as to face respective lock bores 104a on both sides of the second side portion 104 of the lower rail 100.

A bracket 130 including a pin 131 at an end is fixed to the base top portion 111 of the upper rail 110. A spring 132 is wound on the pin 131. Because of a function of the spring 132, the lock member 123 is biased in a direction where the upper rail 110 is locked with the lower rail 100. When a link portion 123a, provided as a part of the lock member 123, is pressed by the release lever 125, the lock member 123 is brought to rotate against a biasing force of the spring 132 to thereby release the engagement between the lock bores 104a and the lock member 123. The release lever 125 is configured to be pressed down when an operation lever (not shown) is pulled up.

According to the aforementioned seat sliding apparatus for a vehicle, in the cases where the operation lever is not activated, the release lever 125 is raised or lifted and thus the upper rail 110 and the lower rail 100 are held in the locked state. When the operation lever is pulled up, the release lever 125 is then pulled down to thereby rotate the lock member 123 on the rotational axis. As a result, the upper rail 110 and the lower rail 100 are brought to the unlocked state so that the upper rail 110 becomes movable relative to the lower rail 100.

However, according to the aforementioned seat sliding apparatus, the lock bores 104a are provided at the second side portion 104, which leads to an elongated second side portion 104 of the lower rail 100. In addition, the through-holes 112a and 114a are provided at the first extending portion 112 and the second extending portion 114 of the upper rail 110, respectively, so as to face the respective lock bores 104a. As a result, a difficult or complicated molding and a large cross-sectional area may be inevitable for the aforementioned seat sliding apparatus.

Thus, a need exits for a seat sliding apparatus for a vehicle which is not susceptible to the drawback mentioned above.

SUMMARY OF THE INVENTION

According to an aspect of the present invention, a seat sliding apparatus for a vehicle includes a lower rail adapted to be mounted to a vehicle floor and an upper rail adapted to be coupled to a vehicle seat and movably supported relative to the lower rail in a longitudinal direction thereof. The lower rail including a base bottom portion arranged in parallel with the vehicle floor, first inner and outer side portions upwardly extending from both ends of the base bottom portion, respectively, upper portions inwardly extending from respective upper ends of the first inner and outer side portions, and second inner and outer side portions downwardly extending from respective inner one ends of the upper portions. The upper rail including a base top portion arranged in parallel with the vehicle floor, first inner and outer extending portions downwardly extending from both ends of the base top portion, respectively, connecting portions outwardly extending from respective lower ends of the first inner and outer extending portions, and second inner and outer extending portions upwardly extending from respective outer one ends of the connecting portions. The seat sliding apparatus for a vehicle further includes a lock mechanism including a lock portion provided at the first inner side portion of the lower rail, a bracket mounted to the upper rail and extending along an outer surface of the first inner side portion of the lower rail, and a lock member rotatably supported at the bracket so as to be engageable with and disengageable from the lock portion. The seat sliding apparatus for a vehicle fiber includes a cutout portion formed across the base top portion and the first inner extending portion of the upper rail and into which the lock member is inserted, and through-holes provided at the second inner extending portion and the bracket, respectively, and facing the lock portion, the through-holes into which the lock member is inserted while the lock member is engaging with the lock portion.

According to another aspect of the present invention, a seat sliding apparatus for a vehicle includes a lower rail adapted to be mounted to a vehicle floor, an upper rail adapted to be coupled to a vehicle seat and movably supported relative to the lower rail in a longitudinal direction thereof, a lock mechanism including a lock portion provided at the lower rail and a lock member rotatably supported at the upper rail so as to be engageable with and disengageable from the lock portion, and a sliding retention member provided between the lower rail and the upper rail and holding the lower rail and the upper rail to be slidable with each other while being in contact with sliding portions provided at the lower rail and the upper rail, respectively. The sliding retention member includes a retainer that includes a through portion pass which the lock member penetrates and balls that are rotatably held by the retainer and that make contact with the respective sliding portions of the lower rail and the upper rail.

BRIEF DESCRIPTION OF THE DRAWINGS

The foregoing and additional features and characteristics of the present invention will become more apparent from the following detailed description considered with reference to the accompanying drawings, wherein:

FIG. 2 is a perspective view of one of the lower rails and one of the upper rails according to the first, second, and fourth embodiments of the present invention;

DETAILED DESCRIPTION

Figure 1:
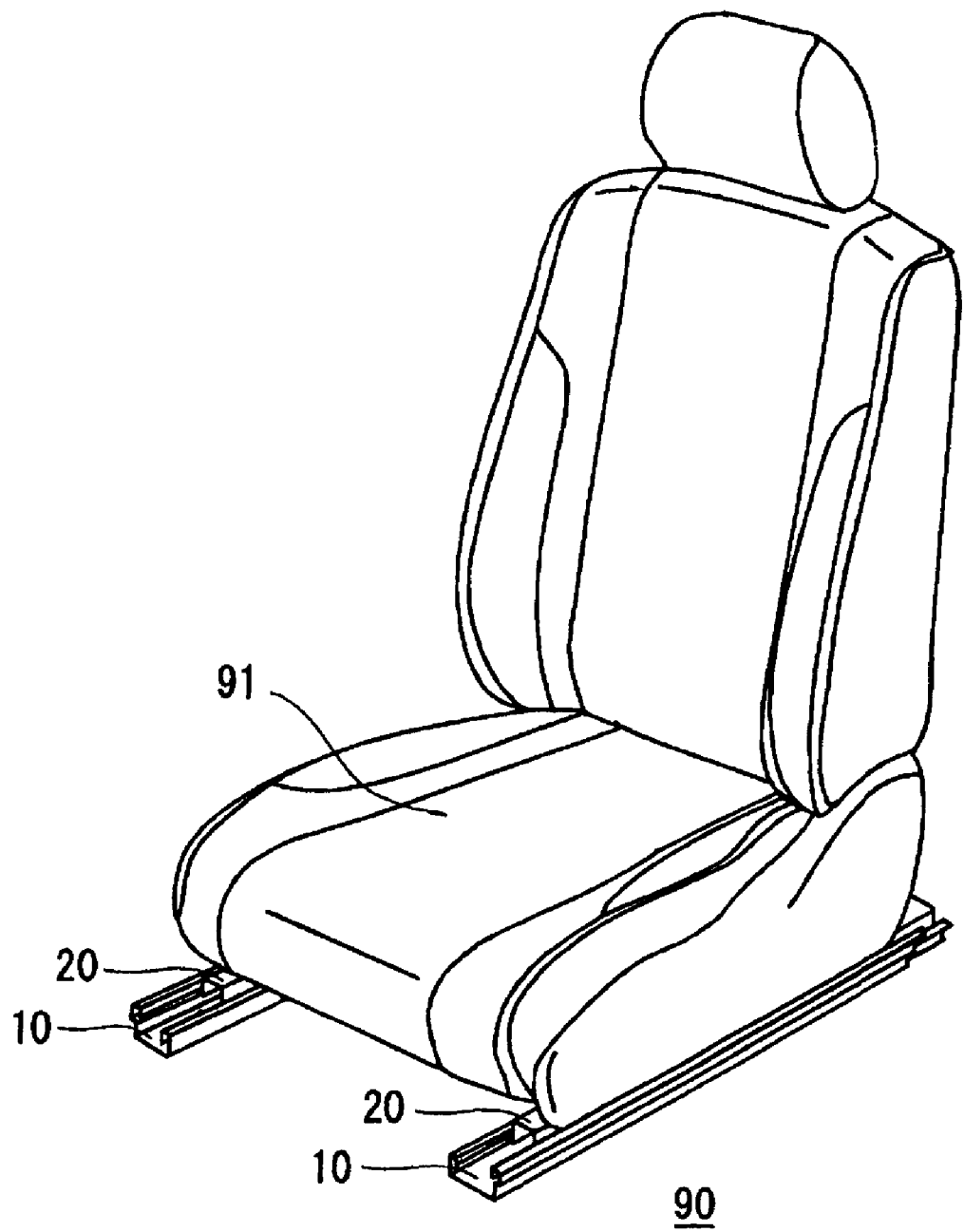
FIG. 1 is a perspective view of a seat sliding apparatus for a vehicle according to first to fourth embodiments of the present invention.

Embodiments of the present invention will be explained with reference to the attached drawings. A seat sliding apparatus for a vehicle according to a first embodiment includes, as illustrated in FIGS. 1 and 2, a pair of lower rails 10 adapted to be mounted or fixed to a vehicle floor 90 along a longitudinal direction thereof, a pair of upper rails 20 adapted to be mounted or fixed to a vehicle seat 91 and movably supported relative to the respective lower rails 10, and a lock mechanism 30 for locking one of the upper rails 20 with one of the lower rails 10 in a releasable manner. Hereinafter, one of the lower rails 10, one of the upper rails 20 and accompanying components such as the lock mechanism 30 arranged at one side of the vehicle seat 91 in a width direction thereof will be explained. However, the other one of the lower rails 10, the other one of the upper rails 20 and accompanying components such as the lock mechanism 30 arranged at the other side of the vehicle seat 91 include substantially the same structure.

Figure 3:
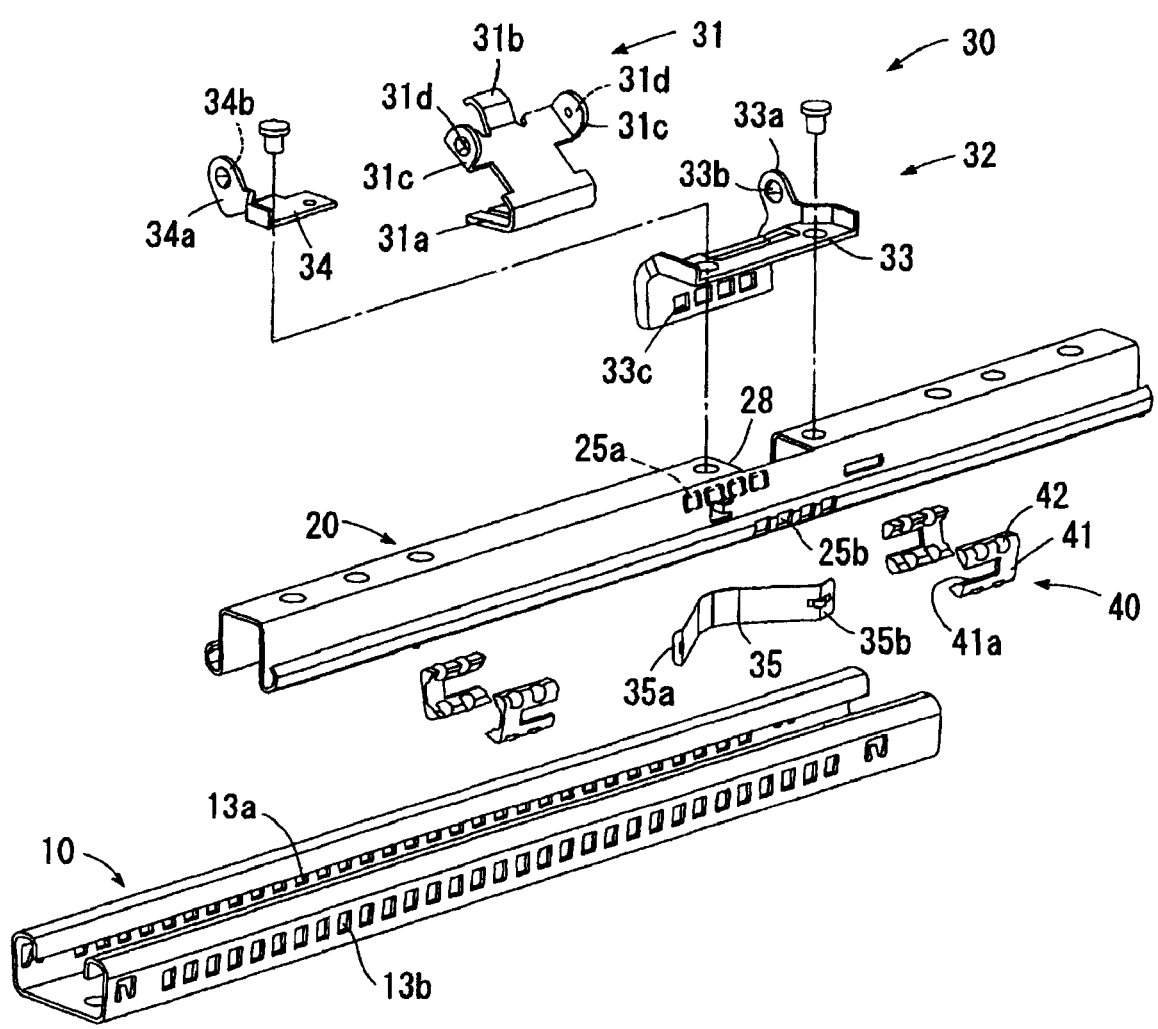
FIG. 3 is an exploded perspective view of the lower rail and the upper rail according to the first, second, and fourth embodiments of the present invention.
Figure 4:
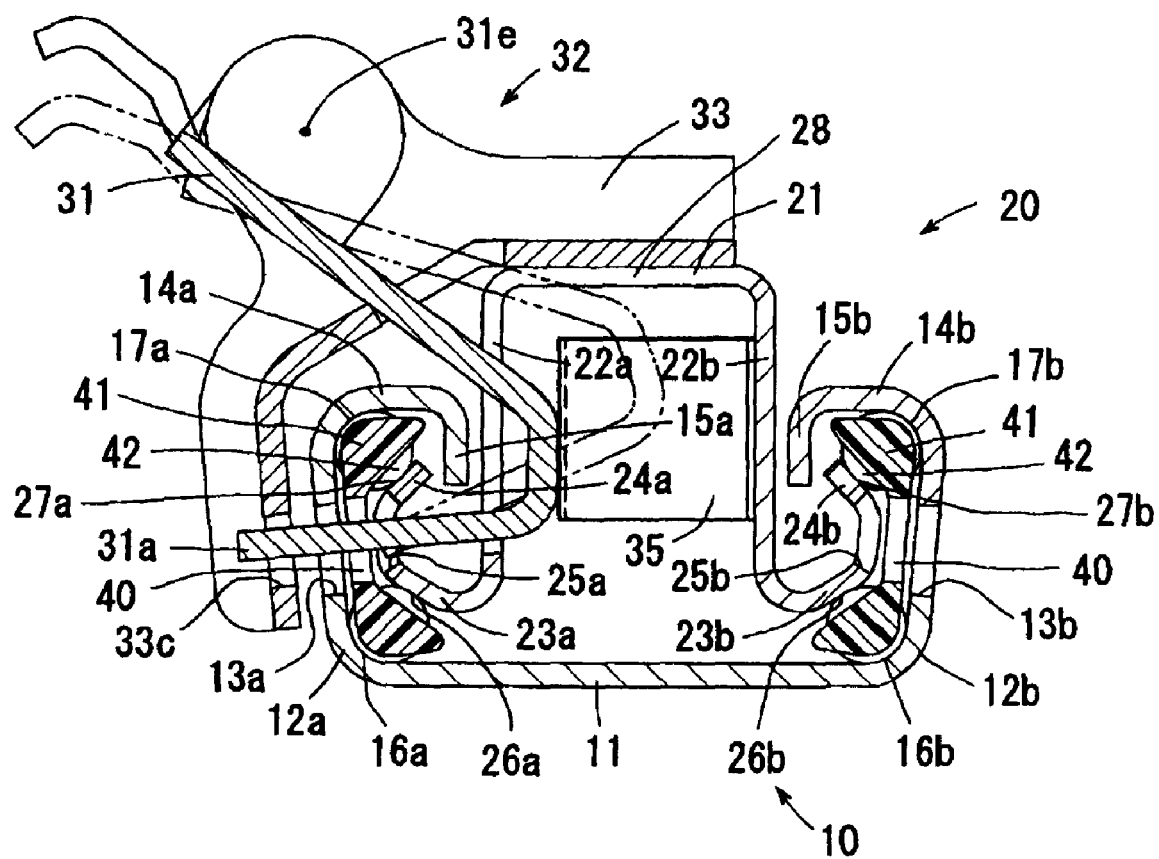
FIG. 4 is a cross-sectional view of the lower rail and the upper rail according to the first, second, and fourth embodiments of the present invention.

As illustrated in FIG. 3, the lock mechanism 30 includes multiple lock bores 13a and 13b formed at the lower rail 10 in a longitudinal direction thereof. As illustrated in FIG. 4, the lower rail 10 includes a base bottom portion 11 arranged substantially in parallel with the vehicle floor 90, first inner and outer side portions 12a and 12b upwardly extending from both ends of the base bottom portion 11, respectively, the first inner side portion 12a arranged on an inner side in a width direction of the vehicle floor 90, the first outer side portion 12b arranged on an outer side in the width direction of the vehicle floor 90, upper portions 14a and 14b inwardly extending from respective upper ends of the first inner and outer side portions 12a and 12b, and second inner and outer side portions 15a and 15b downwardly extending from respective inner one ends of the upper portions 14a and 14b, the second inner side portion 15a arranged on an inner side in a width direction of the vehicle floor 90, the second outer side portion 15b arranged on an outer side in the width direction of the vehicle floor 90. The multiple lock bores 13a are formed at the first inner side portion 12a while the multiple lock bores 13b are formed at the first outer side portion 12b. In this case, the multiple lock bores 13a formed at the first inner side portion 12a constitute a part of a lock portion of the lock mechanism 30. However, in order to enable the lower rail 10 to be arranged at either side in a width direction of the vehicle seat 91, the multiple lock bores 13b are also formed at the first outer side portion 12b. Further, sliding portions 16a, 16b, 17a, and 17b are provided between the base bottom portion 11 and the first inner side portion 12a, between the base bottom portion 11 and the first outer side portion 12b, between the first inner side portion 12a and the upper portion 14a, and between the first outer side portion 12b and the upper portion 14b, respectively, so as to make contact with respective balls 42 of a sliding retention member 40 (to be explained later). The lock bores 13a and 13b are provided between the sliding portions 16a and 17a, and between the sliding portions 16b and 17b, respectively.

The upper rail 20 includes a base top portion 21 arranged substantially in parallel with the vehicle floor 90, first inner and outer extending portions 22a and 22b downwardly extending from both ends of the base top portion 21, respectively, the first inner extending portion 22a arranged on an inner side in the width direction of the vehicle floor 90, the first outer extending portion 22b arranged on an outer side in the width direction of the vehicle floor 90, connecting portions 23a and 23b outwardly extending from respective lower ends of the first inner and outer extending portions 22a and 22b, and second inner and outer extending portions 24a and 24b upwardly extending from respective outer one ends of the connecting portions 23a and 23b, the second inner extending portion 24a arranged on an inner side in the width direction of the vehicle floor 90, the second outer extending portion 24b arranged on an outer side in the width direction of the vehicle floor 90. Through-holes 25a and 25b are provided at the second inner and outer extending portions 24a and 24b, respectively, so as to face the respective lock bores 13a and 13b. In addition, a cutout portion 28 into which a lock lever 31 (lock member) (to be mentioned later) is inserted is formed across the base top portion 21 and the first inner extending portion 22a. Further, sliding portions 26a, 26b, 27a, and 27b are arranged at respective end portions of the connecting portions 23a and 23b, and the second inner and outer extending portions 24a and 24b.

As illustrated in FIGS. 3 and 4, the sliding retention member 40 for retaining the both rails 10 and 20 to be slidable with each other is arranged between the lower rail 10 and the upper rail 20 while being in contact with the sliding portions 16a, 16b, 17a, and 17b of the lower rail 10, and the sliding portions 26a, 26b, 27a, and 27b of the upper rail 20. Specifically, four sliding retention members 40 are arranged between the lower rail 10 and the upper rail 20 in a divided manner in the longitudinal direction thereof. As illustrated in FIGS. 3 and 4, each sliding retention member 40 includes a resin-made retainer 41 and the balls 42 that are rotatably supported by the retainer 41. In addition, a recess portion 41a (through portion) is formed at the retainer 41.

As illustrated in FIG. 3, the lock mechanism 30 includes the lock bores 13a (lock portion), the lock lever 31 (lock member), a bracket 32, and a lock spring 35. The lock lever 31 also includes a lock pawl portion 31a at a lower end that is engageable with and disengageable from the lock bores 13a, and a link portion 31b at an upper end with which a pressing portion of a release lever (not shown) engages to thereby rotate the lock lever 31. Two rotational plates 31c are integrally formed at both end portions of the lock lever 31, respectively, and are supported by the bracket 32. Each rotational plate 31c includes a recess portion 31d having a hemisphere recess surface.

The bracket 32, which includes a first bracket 33 and a second bracket 34, is fixed or mounted to the base top portion 21 of the upper rail 20 on an upper side of the lower rail 10. The bracket 32 extends along an outer surface of the first inner side portion 12a of the lower rail 10. Two support plates 33a and 34a for supporting the lock lever 31 are integrally formed at respective end portions of the first bracket 33 and the second bracket 34. The support plates 33a and 34a include protruding portions 33b and 34b, respectively, that face and engage with the respective recess portions 31d of the rotational plates 31c. While the protruding portions 33b and 34b are engaging with the respective recess portions 31d, the lock lever 31 is supported by the bracket 32 and is rotatable on a rotational axis 31e (see FIG. 4) extending in a longitudinal direction of the upper rail 20. Further, through-holes 33c are formed at a lower portion of the first bracket 33 so as to face the lock bores 13a. In the cases where the upper rail 20 is locked with the lower rail 10, i.e., the upper rail 20 and the lower rail 10 are in the locked state, the lock pawl portion 31a of the lock lever 31 engages with the lock bores 13a while penetrating through the through-holes 25a and 33c.

Within a cross-section of the both rails 10 and 20, one end 35a of the lock spring 35 engages with the upper rail 20 while the other end 35b of the lock spring 35 is assembled onto the upper rail 20 so as to be movable in the longitudinal direction thereof. The lock spring 35 is connected to the lock lever 31 at an arc-shaped bending middle portion and biases the lock lever 31 in a direction where the lock pawl portion 31a engages with the lock bores 13a.

According to the seat sliding apparatus for a vehicle of the first embodiment, the upper rail 20 is locked with the lower rail 10 when the lock lever 31 engages with the multiple lock bores 13a formed at the lower rail 10 in the longitudinal direction thereof. In this case, since the lock bores 13a are formed at the first inner side portion 12a that upwardly extends from the base bottom portion 11 of the lower rail 10, the second inner side portion 15a is prevented from being elongated. Further, since the lock lever 31 engages with the lock bores 13a while penetrating through the through-holes 33c and 25a formed at the bracket 32 and the second inner extending portion 24a of the upper rail 20, respectively, the first inner extending portion 22a and the second inner extending portion 24a can be shortened. As a result, molding of the lower rail 10 and the upper rail 20 can be simplified and a cross-sectional area of the seat sliding apparatus can be reduced. The seat sliding apparatus for a vehicle according to the present embodiment can be easily molded and downsized.

Further, according to the seat sliding apparatus for a vehicle of the first embodiment, the sliding portions 16a and 17a of the lower rail 10 are formed between the base bottom portion 11 and the first inner side portion 12a, and between the first inner side portion 12a and the upper portion 14a, respectively. Thus, in the cases where the lock lever 31 engages with the lock bores 13a, the upper rail 20 can be securely locked with the lower rail 10 and a height of the lower rail 10 can be reduced to thereby save space.

Next, a seat sliding apparatus for a vehicle according to second and third embodiments will be explained below. A known seat sliding apparatus for a vehicle disclosed in JP2005-263049A includes a pair of lower rails, a pair of upper rails, a sliding retention member, and a lock mechanism. The lower rails are fixed to a vehicle floor while the upper rails are fixed to a vehicle seat and movably supported relative to, the respective lower rails. The sliding retention member is arranged between one of the lower rails and one of the upper rails so as to retain the both rails to be slidable with each other while being in contact with respective sliding portions of the both rails. Specifically, four sliding retention members are arranged between one of the lower rails and one of the upper rails in a divided manner in a longitudinal direction thereof. Each sliding retention member includes a flat retainer having a substantially rectangular solid shape and a bail serving as a rolling element held by the retainer. The lock mechanism includes multiple lock bores (lock portion), a lock member, and a bracket. The lock bores are provided at the lower rail in the longitudinal direction thereof. The lock member is provided at the upper rail and rotatable on a rotational axis extending in a longitudinal direction of the upper rail so as to be engageable with and disengageable from the lock bores. The bracket supports the lock member in the rotational axis direction. According to such seat sliding apparatus, when the lock member rotates on the rotational axis and then the upper rail is released from the lower rail, the upper rail turns to be slidable with the lower rail by means of the sliding retention members.

However, according to the seat sliding apparatus disclosed in JP2005-263049A, the retainer of the sliding retention member has a substantially flat rectangular solid shape. Thus, the lock member is prevented from engaging with the lock bores at a portion where the sliding retention member is provided. Therefore, a downsizing of the seat sliding apparatus in the longitudinal direction of the both rails is limited.

In the light of the foregoing, JP2004-314956A discloses a seat sliding apparatus for a vehicle including a pair of lower rails, a pair of upper rails, a sliding retention member, and a lock mechanism. The lower rails are fixed to a vehicle floor while the upper rails are fixed to a vehicle seat and movably supported relative to the respective lower rails. Then, multiple balls serving as the sliding retention member are arranged between one of the lower rails and one of the upper rails. The upper rail and the lower rail are slidable with each other by means of these balls. In addition, the lock mechanism includes multiple lock bores (lock portion), a lock member, and a bracket. The lock bores are provided at the lower rail in a longitudinal direction thereof. The lock member is provided at the upper rail and rotatable on a rotational axis extending in a longitudinal direction of the upper rail so as to be engageable with and disengageable from the lock bores. The bracket supports the lock member in the rotational axis direction. Since the multiple balls are used as the sliding retention member according to the seat sliding apparatus disclosed, the lock member is engageable with the lock bores at a portion where the sliding retention member is provided.

However, according to the seat sliding apparatus for a vehicle disclosed in JP2004-314956A, the balls are not united with the retainer, which may lead to difficulty in assembling. Further, the balls that are not in contact with the both rails may generate a noise.

The second embodiment of the present invention will be explained with reference to the attached drawings. A mechanical structure of a seat sliding apparatus for a vehicle according to the second embodiment is same as that of the first embodiment illustrated in FIGS. 1 to 4 and thus an explanation of the same components will be omitted.

Figure 5:
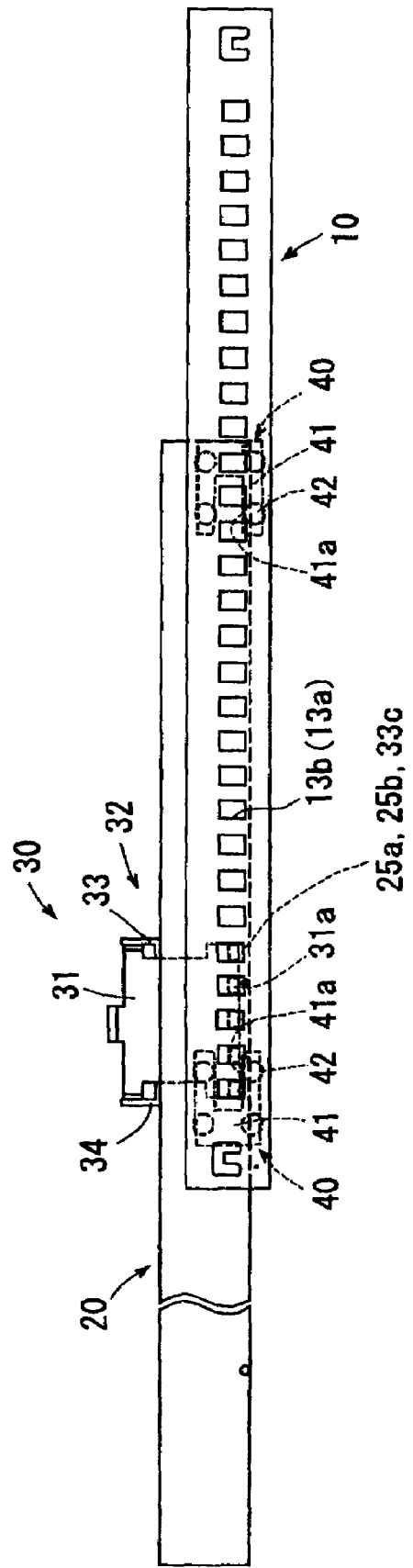
FIG. 5 is a front view of the lower rail and the upper rail in a state where the upper rail is in a foremost position according to the second embodiment of the present invention.
Figure 6:
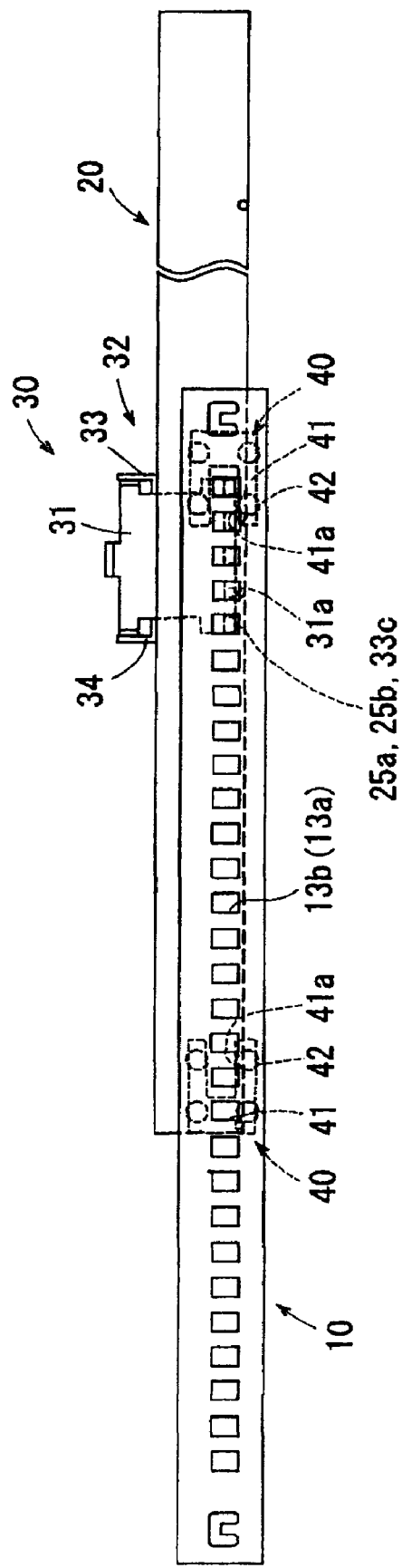
FIG. 6 is a front view of the lower rail and the upper rail in a state where the upper rail is in a rearmost position according to the second embodiment of the present invention.

According to the seat sliding apparatus for a vehicle of the second embodiment, in the cases where the upper rail 20 moves to a foremost position where the lock lever 31 engages with the lock bores 13a as illustrated in FIG. 5, the lock pawl portion 31a of the lock lever 31 penetrates through the recess portion 41a, which functions as a through-hole, of the retainer 41. In addition, in the cases where the upper rail 20 moves to a rearmost position where the lock lever 31 engages with the lock bores 13a as illustrated in FIG. 6, the lock pawl portion 31a of the lock lever 31 also penetrates through the recess portion 41a of the retainer 41.

According to the seat sliding apparatus of the second embodiment, four sliding retention members 40 are arranged between the lower rail 10 and the upper rail 20 in a divided manner in the longitudinal direction thereof. Each sliding retention member 40 includes the retainer 41 and the balls 42 rotatably supported by the retainer 41. The retainer 41 includes the recess portion 41a through which the lock lever 31 penetrates. Therefore, the lock lever 31 is engageable with the lock bores 13a even at a portion where the sliding retention member 40 is provided, which leads to a downsizing of the seat sliding apparatus. Further, since the balls 42 are united with the retainer 41, the assembly may be simplified and all the balls 42 make contact with the both rails 10 and 20 to thereby prevent generation of the noise by the balls 42.

According to the seat sliding apparatus of the second embodiment, the sliding retention member 40 includes the retainer 41 having a substantially transverse U-shape including an upper portion for supporting multiple balls, i.e., two balls 42, for example, that make contact with the sliding portion 17a or 17b formed between the first inner or outer side portion 12a or 12b and the upper portion 14a or 14b and a lower portion for supporting multiple balls, i.e., two balls 42, for example, that make contact with the sliding portion 16a or 16b formed between the base bottom portion 11 and the first inner or outer side portion 12a or 12b. Alternatively, the retainer 41 may have a substantially L-shape including an upper portion for supporting one ball 42 and a lower portion for supporting multiple balls, i.e., two balls 42, for example.

Next, a third embodiment of the present invention will be explained below. Substantially same parts or components of a seat sliding apparatus for a vehicle according to the third embodiment as those of the first embodiment illustrated in FIGS. 1 to 4 bear the same numbers and thus an explanation will be omitted.

Figure 7:
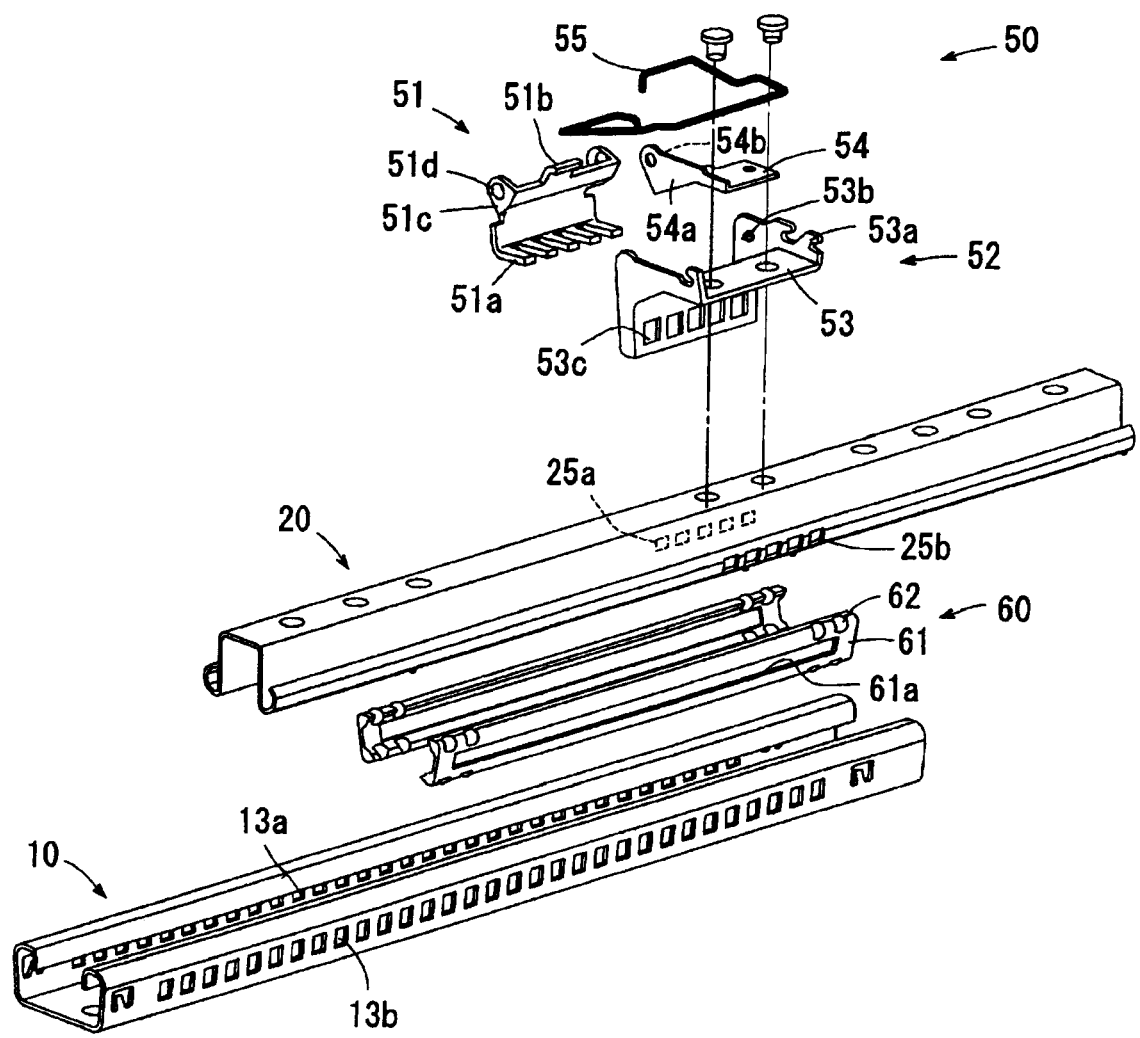
FIG. 7 is an exploded perspective view of the lower rail and the upper rail according to the third embodiment of the present invention.
Figure 8:
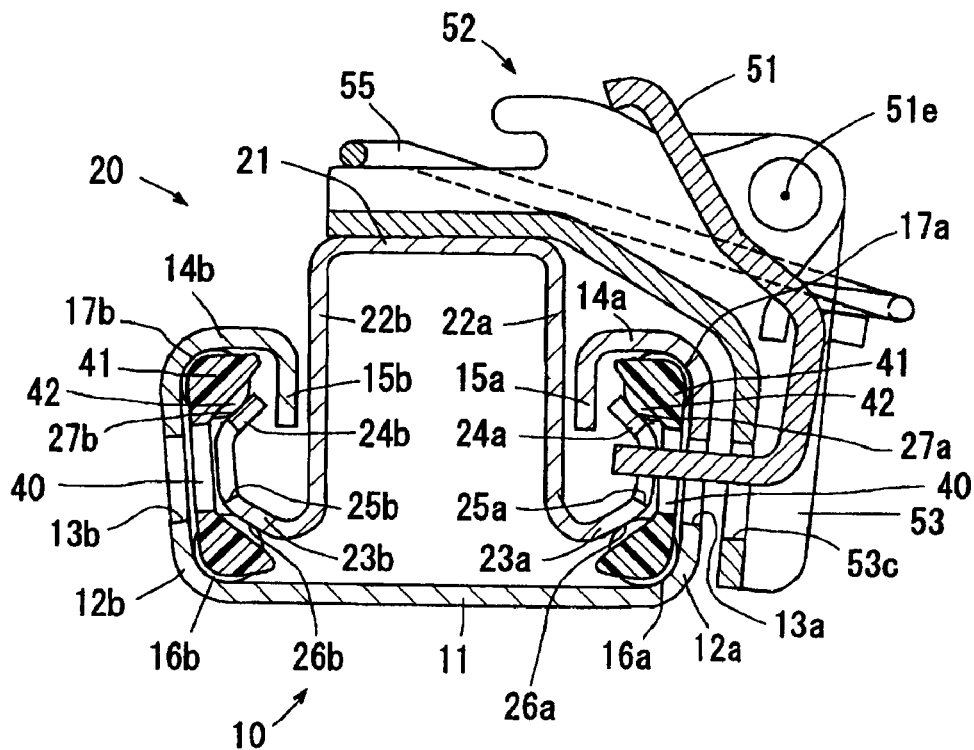
FIG. 8 is a cross-sectional view of the lower rail and the upper rail according to the third embodiment of the present invention.

According to the seat sliding apparatus for a vehicle of the third embodiment, as illustrated in FIGS. 7 and 8, a sliding retention member 60 is provided between the lower rail 10 and the upper rail 20 while being in contact with the sliding portions 16a, 16b, 17a, and 17b of the lower rail 10 and the sliding portions 26a, 26b, 27a, and 27b of the upper rail 20, for the purposes of retaining the both rails 10 and 20 to be slidable with each other. Specifically, two sliding retention members 60 are arranged between the both rails 10 and 20 so as to integrally extend in the longitudinal direction thereof. Each sliding retention member 60 includes a resin-made retainer 61 and balls 62 rotatably retained by the retainer 61. In addition, an opening portion 61a (through portion) is formed at the retainer 61.

The seat sliding apparatus according to the third embodiment includes a lock mechanism 50 including the lock bores 13a, a lock lever 51 (lock member), a bracket 52, and a lock spring 55. The lock lever 51 includes a lock pawl portion 51a at a lower end that is engageable with and disengageable from the lock bores 13a. The lock lever 51 also includes a link portion 51b at an upper end with which a pressing portion of a release lever (not shown) engages to thereby rotate the lock lever 51. Two rotational plates 51c are integrally formed at both end portions of the lock lever 51, respectively, and supported by the bracket 52. Each rotational plate 51c includes a recess portion 51d having a hemisphere recess surface.

The bracket 52, which includes a first bracket 53 and a second bracket 54, is fixed to the base top portion 21 of the upper rail 20 on an upper side of the lower rail 10. The bracket 52 extends along an outer surface of the first inner side portion 12a of the lower rail 10. Two support plates 53a and 54a for supporting the lock lever 51 are integrally formed at respective end portions of the first bracket 53 and the second bracket 54. The support plates 53a and 54a include protruding portions 53b and 54b, respectively, that face and engage with the respective recess portions 51d of the rotational plates 51c. While the protruding portions 53b and 54b are engaging with the respective recess portions 51d, the lock lever 51 is supported by the bracket 52 and is rotatable on a rotational axis 51e extending in the longitudinal direction of the upper rail 20. Further, through-holes 53c are formed at a lower portion of the first bracket 53 so as to face the lock bores 13a. In the cases where the upper rail 20 is locked with the lower rail 10, i.e., the upper rail 20 and the lower rail 10 are in the locked state, the lock pawl portion 51a of the lock lever 51 engages with the lock bores 13a while penetrating through the through-holes 25a and 53c. The lock spring 55 engages with the lock lever 51 and the bracket 52 so as to bias the lock lever 51 in a direction where the lock pawl portion 51a engages with the lock bores 13a.

According to the seat sliding apparatus for a vehicle of the third embodiment, two sliding retention members 60 are arranged between the lower rail 10 and the upper rail 20 so as to integrally extend in the longitudinal direction thereof. Each of the sliding retention members 60 includes the retainer 61 and the balls 62 rotatably retained by the retainer 61. In addition, the retainer 61 includes the opening portion 61a through which the lock lever 51 penetrates. Therefore, the lock lever 51 is engageable with the lock bores 13a even at a portion where the sliding retention member 60 is provided to thereby reduce a length of the both rails 10 and 20 in the longitudinal direction thereof. According to the seat sliding apparatus of the third embodiment, as well as the seat sliding apparatus for a vehicle according to the second embodiment, a downsizing of the apparatus may be achieved. Further, since the balls 62 are united with the retainer 61, the assembly may be simplified and all the balls 42 make contact with the both rails 10 and 20 to thereby prevent generation of the noise by the balls 42.

Next, a seat sliding apparatus for a vehicle according to a fourth embodiment will be explained below. A known seat sliding apparatus for a vehicle disclosed in JP3119779B2 includes a pair of lower rails, a pair of upper rails, a sliding retention member, and a lock mechanism. The lower rails are fixed to a vehicle floor while the upper rails are fixed to a vehicle seat and movably supported relative to the respective lower rails. The sliding retention member including balls each having a spherical shape and rollers each having a column shape is provided between one of the lower rails and one of the upper rails. The sliding retention member retains the both rails to be slidable with each other while being in contact with sliding portions of the both rails. In this case, projections (i.e., compressed rib) formed at the sliding portions of the both rails are crushed by the rollers after assembly so as to be plastically deformed, which may lead to high hardness of the sliding portions. As a result, a variation of a gap formed between the upper rail and the lower rail in the longitudinal direction thereof can be absorbed so as to reduce a noise generation and to achieve a smooth sliding operation of the rails.

However, according to the seat sliding apparatus for a vehicle disclosed in JP3119779B2, it may be difficult to form the projections at both the upper rail and the lower rail and to mold the upper rail and the lower rail. In addition, possible plastic deformation may occur due to a long-term use, and the like, of the rails. Thus, long-term absorption of a variation of a gap formed between the upper rail and the lower rail in the longitudinal direction thereof may not be ensured. Further, according to the aforementioned seat sliding apparatus, an amount of plastic deformation is determined by the rollers, which may prevent adjustment of the hardness of the sliding portions.

The fourth embodiment of the present invention will be explained with reference to the attached drawings. A mechanical structure of a seat sliding apparatus for a vehicle according to the fourth embodiment is same as that of the first embodiment illustrated in FIGS. 1 to 4 and thus an explanation of the same components will be omitted.

Figure 9:
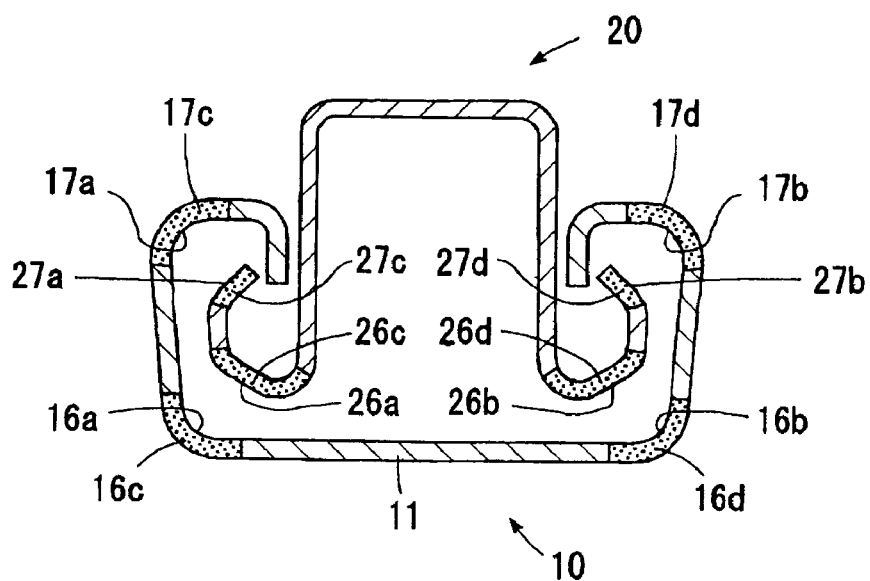
FIG. 9 is a cross-sectional view of the lower rail and the upper rail according to the fourth embodiment of the present invention.
Figure 10:
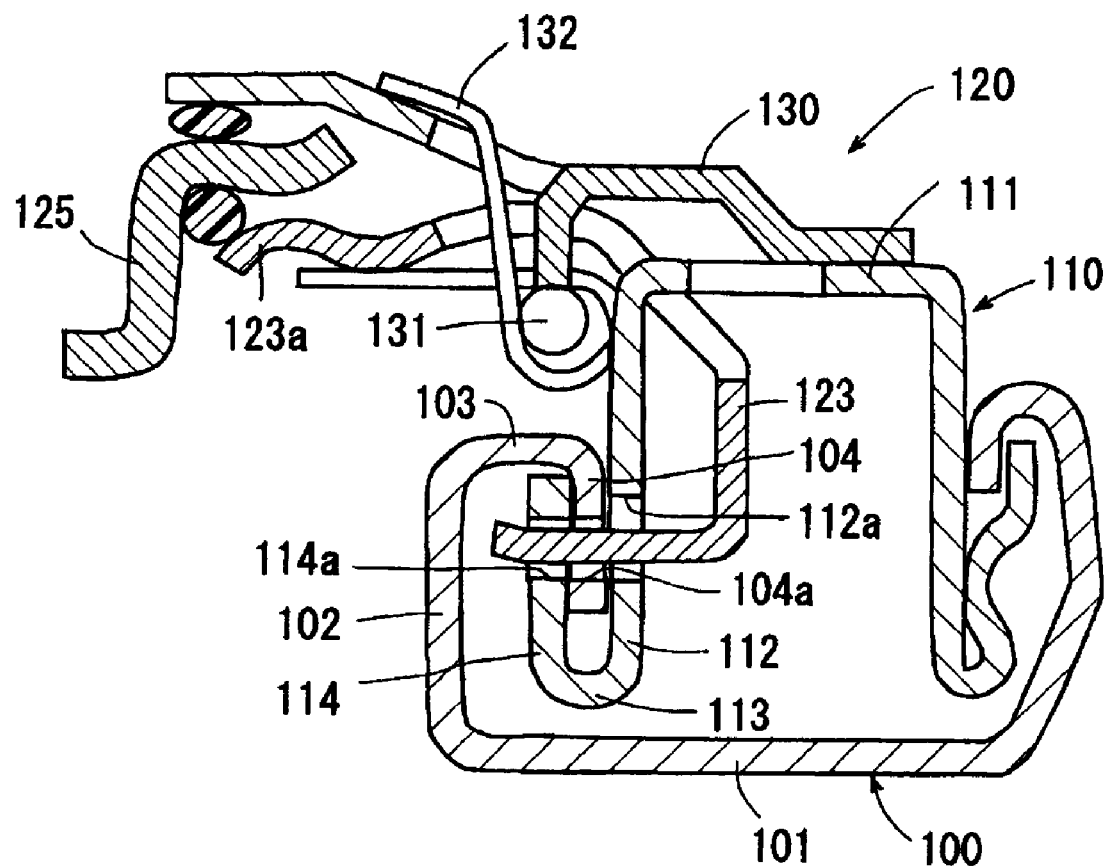
FIG. 10 is a cross-sectional view of a conventional seat sliding apparatus for a vehicle.

According to the fourth embodiment, as illustrated in FIG. 9, peripheral portions 16c, 16d, 17c, 17d, 26c, 26d, 27c, and 27d including the sliding portions 16a, 16b, 17a, 17b, 26a, 26b, 27a, and 27b, respectively, have been compressed beforehand in a thickness direction by means of pressing, and the like. Thus, the peripheral portions 16c, 16d, 17c, 17d, 26c, 26d, 27c, and 27d are plastically deformed and work-hardened. In this case, however, a hardness of the balls 42 (rolling member) is configured to be higher than that of the peripheral portions 16c, 16d, 17c, 17d, 26c, 26d, 27c, and 27d.

According to the fourth embodiment, the both rails 10 and 20 may be easily molded by the prior compression of the peripheral portions 16c, 16d, 17c, 17d, 26c, 26d, 27c, and 27d in the thickness direction. Further, since the peripheral portions 16c, 16d, 17c, 17d, 26c, 26d, 27c, and 27d have been sufficiently compressed before assembly of the both rails 10 and 20, further plastic deformation because of a long-term use, and the like, of the rails 10 and 20 may be unlikely to occur and a variation of a gap formed between the both rails 10 and 20 in the longitudinal direction thereof may be absorbed over a long time. Furthermore, since the hardness of the peripheral portions 16c, 16d, 17c, 17d, 26c, 26d, 27c, and 27d is adjustable, material of the balls 42 is not limited. As a result, the seat sliding apparatus for a vehicle according to the fourth embodiment may achieve an easy molding and prevent the noise occurrence for a long time as well as achieving a smooth sliding operation.

Further, the hardness of the balls 42 is higher than that of the peripheral portions 16c, 16d, 17c, 17d, 26c, 26d, 27c, and 27d. Thus, the plastic deformation of the balls 42 may be prevented to thereby obtain a stable sliding operation.

In the cases where not only the peripheral portions 16c, 16d, 17c, 17d, 26c, 26d, 27c, and 27d but also the both rails 10 and 20 are compressed in a thickness direction, the both rails 10 and 20 may be broken upon reception of a strong load and thus it is not appropriate. Further, two sliding retention members 40 may integrally extend in the longitudinal direction of the both rails 10 and 20 or alternatively, the sliding retention member 40 may be constituted by multiple balls 42 only.

According to the aforementioned embodiments, the upper rail 20 is locked with the lower rail 10 while the lock lever 31 engages with the multiple lock bores 13a formed at the first inner side portion 12a of the lower rail 10 in the longitudinal direction thereof. Since the lock bores 13a are formed at the first inner side portion 12a upwardly extending from the base bottom portion 11 of the lower rail 10, the second inner side portion 15a is prevented from being elongated. In addition, the lock lever 31 engages with the lock bores 13a while penetrating through the through-holes 33c (or 53c) and 25a formed at the bracket 32 and the second inner extending portion 24a of the upper rail 20. Thus, the first inner extending portion 22a and the second inner extending portion 24a may be shortened. As a result, the lower rail 10 and the upper rail 20 may be easily molded and a cross-sectional area of the seat sliding apparatus can be reduced. Accordingly, the seat sliding apparatus for a vehicle according to the aforementioned embodiments can achieve an easy molding and a downsizing.

Further, according to the aforementioned embodiments, the sliding portions 16a and 17a of the lower rail 10 are formed between the base bottom portion 11 and the first inner side portion 12a, and between the first inner side portion 12a and the upper portion 14a. Then, the lock bores 13a are formed between the both sliding portions 16a and 17a of the lower rail 10. Accordingly, the upper rail 20 is securely locked with the lower rail 10 in a state where the lock lever 31 engages with the lock bores 13a to thereby reduce a height of the lower rail 10a and save space.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which, fall within the spirit and scope of the present invention as defined in the claims, be embraced thereby.

The invention claimed is:

1. A seat sliding apparatus for a vehicle, comprising:
a lower rail mounted to a vehicle floor, the lower rail including:
a base bottom portion arranged in parallel with the vehicle floor, a first inner side portion and a first outer side portion, the first inner and outer side portions upwardly extending from both lateral ends of the base bottom portion, respectively,
upper portions inwardly extending from respective upper ends of the first inner and outer side portions, and
second inner and outer side portions downwardly extending from respective inner ends of the upper portions;
an upper rail coupled to a vehicle seat and movably supported relative to the lower rail in a longitudinal direction thereof, the upper rail including:
a base top portion arranged in parallel with the vehicle floor,
a first inner extending portion and a first outer extending portion, the first inner and outer extending portions downwardly extending from both lateral ends of the base top portion, respectively,
connecting portions outwardly extending from respective lower ends of the first inner and outer extending portions, and
second inner and outer extending portions upwardly extending from respective outer ends of the connecting portions;

a lock mechanism including:
- a lock portion provided at the first inner side portion of the lower rail,
- a bracket mounted to the upper rail and extending along an outer surface of the first inner side portion of the lower rail, and
- a lock member rotatably supported at the bracket so as to be engageable with and disengageable from the lock portion;

a cutout portion formed across the base top portion and the first inner extending portion of the upper rail and into which the lock member is inserted; and through-holes provided at the second inner extending portion and the bracket, respectively, and facing the lock portion, the through-holes into which the lock member is inserted while the lock member is engaging with the lock portion.

2. A seat sliding apparatus for a vehicle according to claim 1, further comprising a sliding retention member provided between the lower rail and the upper rail such that the lower rail and the upper rail are slidable with each other while in contact with sliding portions provided at the lower rail and the upper rail, respectively.

3. A seat sliding apparatus for a vehicle according to claim 2, wherein
the sliding portions of the lower rail include two sliding portions, a first sliding portion formed between the base bottom portion and the first inner side portion and the second sliding portion formed between the first inner side portion and the upper portion, and
the lock portion is provided between the two sliding portions.

4. A seat sliding apparatus for a vehicle according to claim 2, wherein the sliding retention member includes a retainer including a through portion through which the lock member penetrates and balls rotatably held by the retainer, the balls making contact with the respective sliding portions of the lower rail and the upper rail.

5. A seat sliding apparatus for a vehicle according to claim 3, wherein the sliding retention member includes a retainer including a through portion through which the lock member penetrates and balls rotatably held by the retainer, the balls making contact with the respective sliding portions of the lower rail and the upper rail.

6. A seat sliding apparatus for a vehicle according to claim 5, wherein the retainer is formed in a transverse U-shape including:
- an upper portion for supporting a plurality of the balls that contact the sliding portion formed between one of the first inner and outer side portions and one of the upper portions of the lower rail; and
- a lower portion for supporting a plurality of the balls that contact the sliding portion formed between the base bottom portion and one of the first inner and outer side portions of the lower rail.

* * * * *